United States Patent [19]

LeMonds et al.

[11] Patent Number: 5,285,573
[45] Date of Patent: Feb. 15, 1994

[54] METHOD FOR MANUFACTURING HOLLOW AIRFOILS (FOUR-PIECE CONCEPT)

[75] Inventors: Jeffrey LeMonds, Clifton Park, N.Y.; Jung-Ho Cheng, Taipei, Taiwan; Gene E. Wiggs, West Chester, Ohio; Gary T. Martini, Loveland, Ohio; Richard M. Cogan, Cincinnati, Ohio

[73] Assignee: General Electric Company, Schenectady, N.Y.

[21] Appl. No.: 29,286

[22] Filed: Mar. 8, 1993

Related U.S. Application Data

[63] Continuation of Ser. No. 803,853, Dec. 9, 1991, abandoned.

[51] Int. Cl.$^5$ .............................................. B23P 15/00
[52] U.S. Cl. ................. 29/889.72; 29/889.7; 29/463
[58] Field of Search ................ 29/889.72, 889.7, 463; 228/157, 193, 234, 236, 243

[56] References Cited

U.S. PATENT DOCUMENTS

| | | | |
|---|---|---|---|
| 2,982,012 | 5/1961 | Wilkins et al. | 228/118 |
| 3,920,175 | 11/1975 | Hamilton et al. | 228/173 |
| 3,927,817 | 12/1975 | Hamilton et al. | 228/157 |
| 3,936,920 | 2/1976 | Conn, Jr. | 29/889.72 |
| 4,217,397 | 8/1980 | Hayase et al. | 228/157 |
| 4,294,419 | 10/1981 | Fouse et al. | 244/117 R |
| 4,392,602 | 7/1983 | Darby | 228/157 |
| 4,530,197 | 7/1985 | Rainville | 52/797 |
| 4,642,863 | 2/1987 | Schulz | 29/156.8 B |
| 4,882,823 | 11/1989 | Weisert et al. | 29/889.72 |
| 4,934,580 | 6/1990 | Sutton | 228/157 |
| 5,024,369 | 6/1991 | Froes et al. | 228/265 |
| 5,063,662 | 11/1991 | Porter et al. | 29/889.72 |

OTHER PUBLICATIONS

Weisert, "Hollow Titanium Turbofan Blades," Report presented at the Metallurgical Society, AIME Symposium on Superplasticity in Aerospace, Phoenix, Ariz., Jan. 25-28, 1988.

*Primary Examiner*—Irene Cuda
*Attorney, Agent, or Firm*—Patrick L. Scanlon; Paul R. Webb, II

[57] ABSTRACT

A method is provided for making a four-piece hollow airfoil. Four metal sheets are preformed into initial shapes. The sheets are sealed together into two pairs or sub-assemblies. Internal cavities are formed in one sheet from each pair prior to sealing. Each sub-assembly is subjected to high temperature and pressure in order to diffusion bond the sheets together at selected points. The cavities of each sub-assembly are then subjected to internal pressure in order to inflate and superplastically deform the sub-assemblies. The inflated sub-assemblies are combined to form a single assembly and the cavities are again subjected to internal pressure in order to bond the sub-assemblies together. The assembly is then exposed to hot isostatic pressing, after which, excess material is machined off.

19 Claims, 10 Drawing Sheets

METHOD FOR MANUFACTURING HOLLOW AIRFOILS (FOUR-PIECE CONCEPT)

This application is a continuation of application Ser. No. 07/803,853, filed Dec. 9, 1991, abandoned.

CROSS REFERENCES TO RELATED APPLICATIONS

This application is related to copending application entitled "Design and Processing Method for Manufacturing Hollow Airfoils (Three-Piece Concept)", Ser. No. 07/803,852, filed concurrently herewith and assigned to the same assignee as the present invention.

BACKGROUND OF THE INVENTION

This invention relates generally to fabricating hollow airfoils and more particularly concerns a method of producing lightweight, high-strength hollow airfoils using diffusion bonding and superplastic forming techniques. This method is particularly useful in making hollow titanium aircraft engine blades for integrally-bladed rotors.

Superplastic forming is a technique that relies on the capability of certain materials, such as titanium alloys, to develop unusually high tensile elongation with a minimal tendency towards necking when submitted to coordinated time-temperature-strain conditions within a limited range. Superplastic forming is useful in producing a wide variety of strong, lightweight articles.

Many of the same materials used in superplastic forming are also susceptible to diffusion bonding. Diffusion bonding is a process which forms a metallurgical bond between similar parts which are pressed together at elevated temperature and pressure for a specific length of time. Bonding is believed to occur by the movement of atoms across adjacent faces of the parts. Diffusion bonding provides substantial joint strength with little geometrical distortion and without significantly changing the physical or metallurgical properties of the bonded material.

It has long been desirable to fabricate various aircraft components, such as door panels and wing flaps, as hollow bodies. The benefits of such are a substantial reduction in weight which provides improved fuel efficiency and increased thrust-to-weight ratio. Despite the increasing popularity in applying diffusion bonding and superplastic forming (DB/SPF) techniques to the manufacture of aircraft components, there are many critical problems to overcome in successfully forming a hollow airfoil. Parts formed using DB/SPF techniques have very complex geometries, exhibit highly non-linear material behavior, and are subject to large irreversible strains. Thus, there exists the possibility of many deformation-induced instabilities, such as necking, grooving, buckling and shear localization, which substantially weaken the structural integrity of the part.

SUMMARY OF THE INVENTION

Accordingly, it is an object of the present invention to provide a method for manufacturing hollow airfoils which avoids the problem of deformation-induced instabilities.

More specifically, it is an object of the present invention to provide a method for manufacturing hollow airfoils from four metal sheets using a combination of diffusion bonding and superplastic forming techniques.

These and other objects are accomplished in the present invention by first forming four metal sheets into their in-process shapes (i.e., the shape of the parts prior to superplastic forming). Next, a plurality of cavities are machined into two of the sheets and stopoff is applied to each of the cavities. Each one of the machined sheets is combined with a respective one of the unaltered sheets in order to form two sub-assemblies. The sheets are arranged so that each machined surface contacts the adjacent sheet. The sheets are then welded together around their peripheries. The resulting sub-assemblies are then evacuated. Both sub-assemblies are subjected to sufficient pressure-temperature-time duration conditions so as to diffusion bond the portions of the sheets lacking stopoff together. Each sub-assembly is then superplastically formed by applying pressure to the cavities so that one of the sheets is deformed into a truss member. The two inflated sub-assemblies are then arranged together to form a single assembly. The cavities are again subjected to internal pressure causing the two sub-assemblies to bond together. The assembly then undergoes hot isostatic pressing, after which, excess material is machined off.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
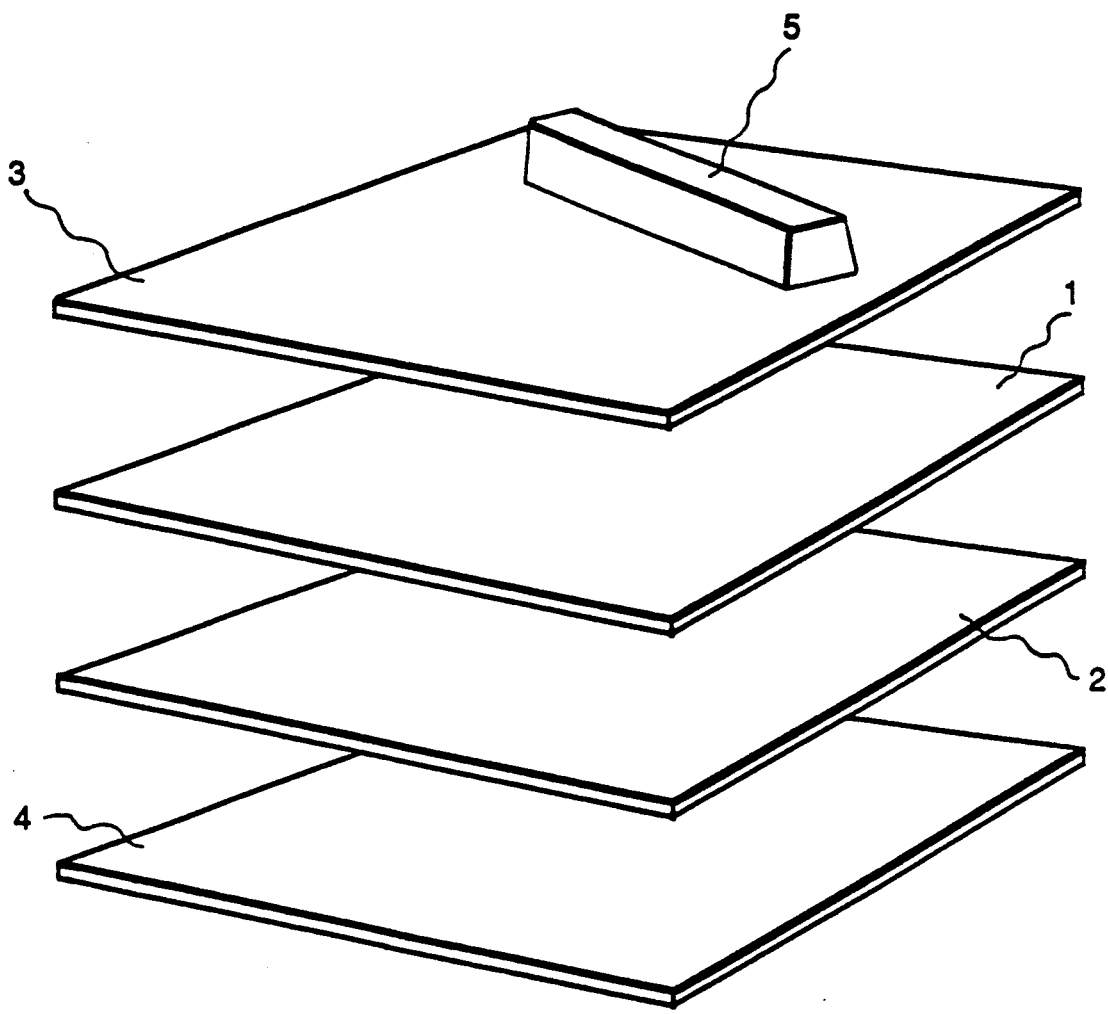
FIG. 1 shows the four pieces used in the method of the present invention.

Turning first to FIG. 1, the components used in making the hollow airfoil are shown. In accordance with the present invention, four machined sheets are provided. The sheets are preferably made of titanium and comprise two core sheets 1 and 2 and two face sheets 3 and 4. The core sheets 1,2 are approximately 0.030 to 0.040 inches thick. The face sheets 3,4 are considerably thicker than the core sheets, having a thickness on the order of 0.250 to 0.060 inches. Each face sheet is provided with an oversized root 5 which provides a means for attaching the finished blade to the hub of an aircraft engine.

Figure 2:
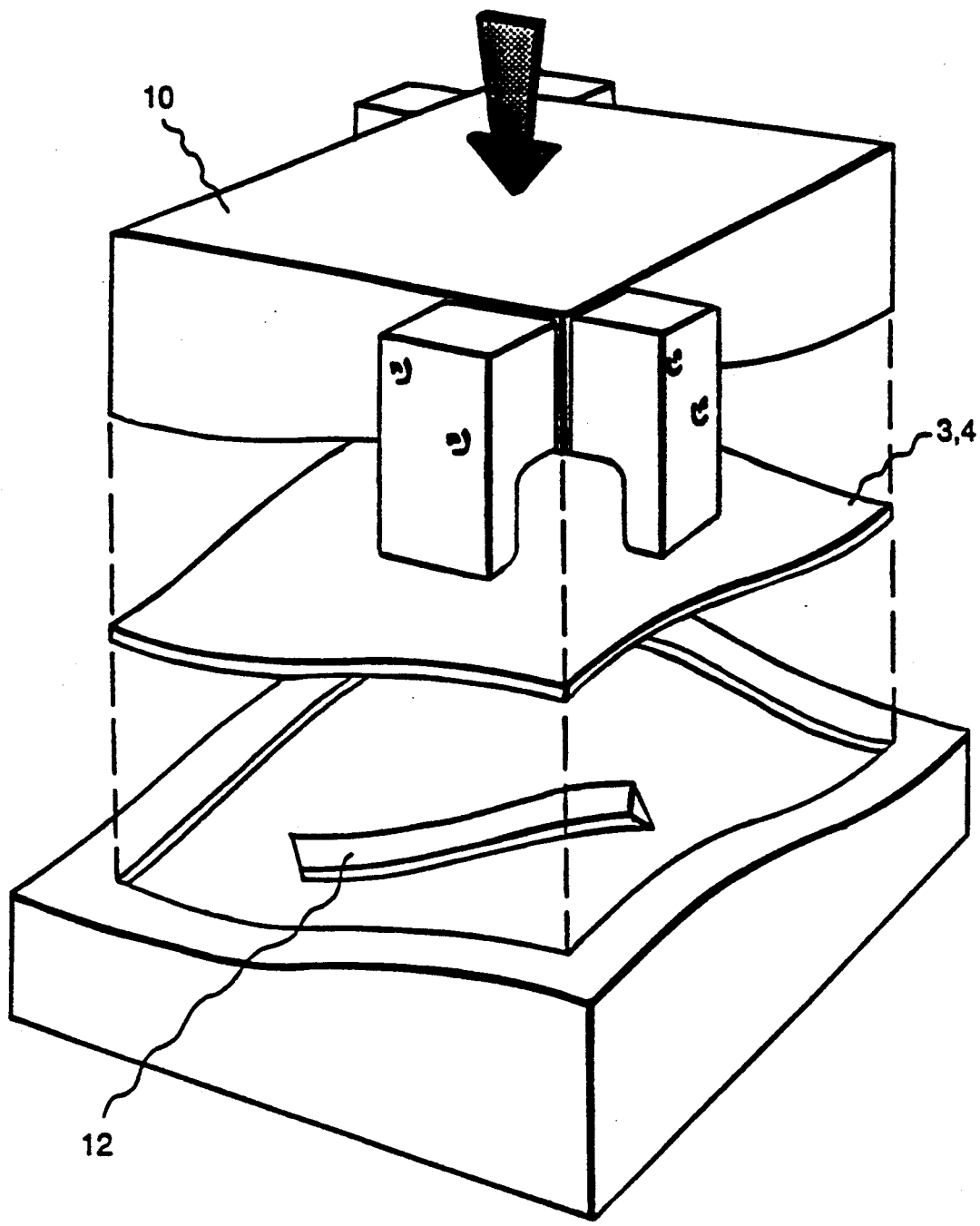
FIG. 2 illustrates the step of forming the face sheets.

Initially, the four separate sheets must be formed into their in-process shapes before a subsequent superplastic forming procedure can be carried out. The in-process shape is the shape each respective part must take prior to superplastic forming to ensure that the desired final shape and thickness will be achieved after deformation. FIG. 2 shows the first step in which the face sheets 3,4 are hot formed in a hot form press 10. (For simplicity, only one face sheet is shown). A groove 12 is provided in the lower die of the hot form press 10 to accommodate the root 5 on each of the face sheets. The first face sheet 3 is formed with a convex outer surface, while the other face sheet 4 is provided with a concave outer surface.

Figure 3:
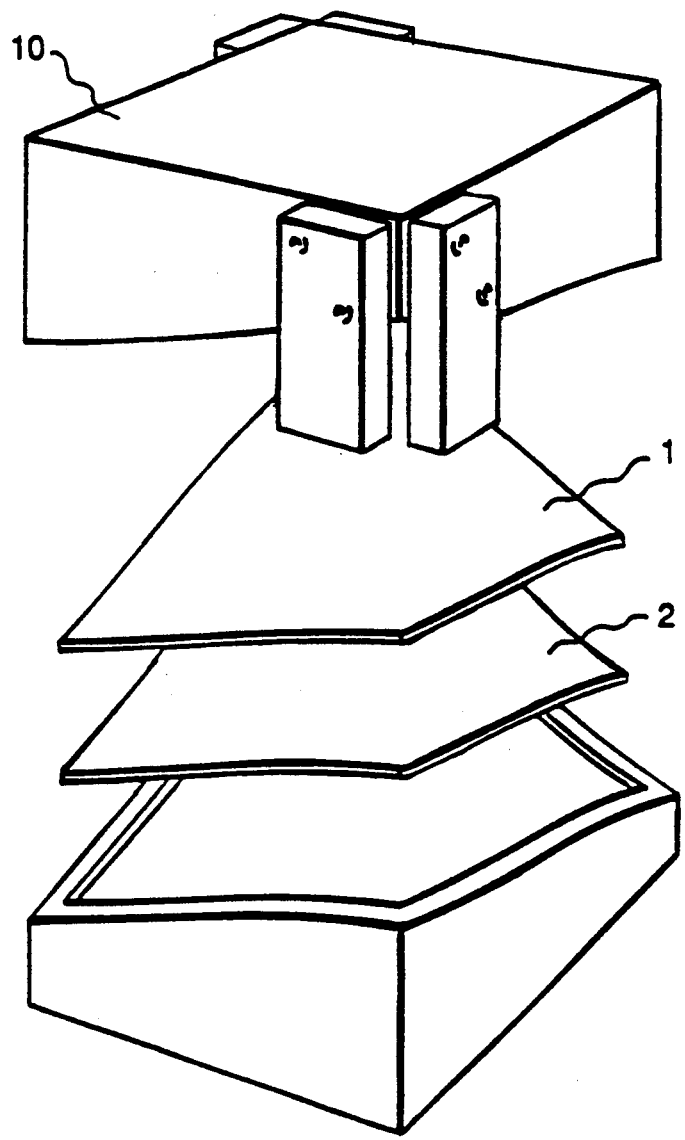
FIG. 3 illustrates the step of forming the core sheets.

Next, the core sheets 1,2 are hot formed into their in-process shapes in the hot form press 10 as seen in FIG. 3. Each core sheet is hot-pressed into a shape identical to the shape of the inner surface of a corresponding one of the two face sheets 3,4. Thus, core sheet 1 conforms with the inner surface of face sheet 3 and core sheet 2 conforms with the inner surface of face sheet 4. In the preferred embodiment described above, the four separate sheets 1-4 are formed into their in-process shapes by hot forming alone. Alternatively, the sheets can be formed by a two-step procedure in which the sheets are initially hot formed and then superplastically deformed to the in-process shape in a superplastic forming (SPF) tool. The two-step forming process is particularly useful for the thicker face sheets, the much thinner core sheets being easier to shape.

As another alternative, the face sheets 3,4 may be near-net-shape forged to the desired in-process shape. Near-net-shape forging is carried out in a forge press at a high temperature on the order of approximately 1700° F.

Figure 4:
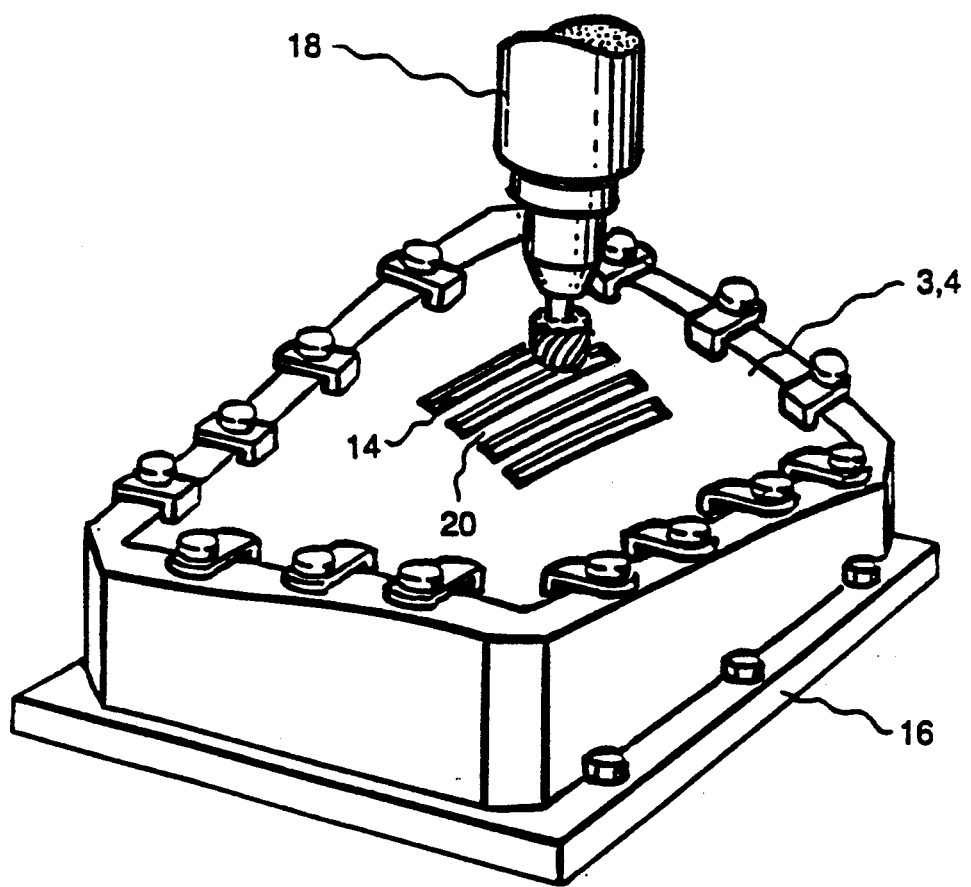
FIG. 4 shows the step of machining cavities into the face sheets.
Figure 5:
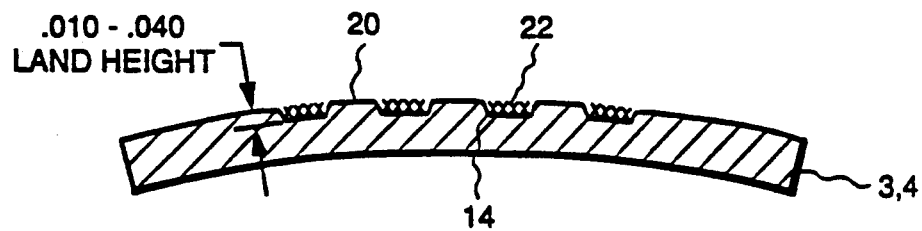
FIG. 5 shows a machined face sheet with stopoff applied.

Once the in-process shapes have been obtained, a plurality of cavities 14 are machined into the inner surface of each of the face sheets 3,4. As seen in FIG. 4, the face sheets 3,4 are successively placed in a nest fixture 16 which holds the sheets secure for machining. A mill 18 machines a series of elongated cavities 14 to a depth of approximately 0.010 to 0.040 inches into the surface of the sheet. Narrow lands 20 are left between the cavities 14. Referring to FIG. 5, a stopoff material 22 such as yttrium oxide is applied to all the cavities 14 of both face sheets 3,4. (For simplicity, only one face sheet is shown). No stopoff is applied to the lands 20 or any other part of the face sheets except for the cavities 14. The stopoff prevents the contacting sheets from diffusion bonding at the locations where it is applied.

Figure 6:
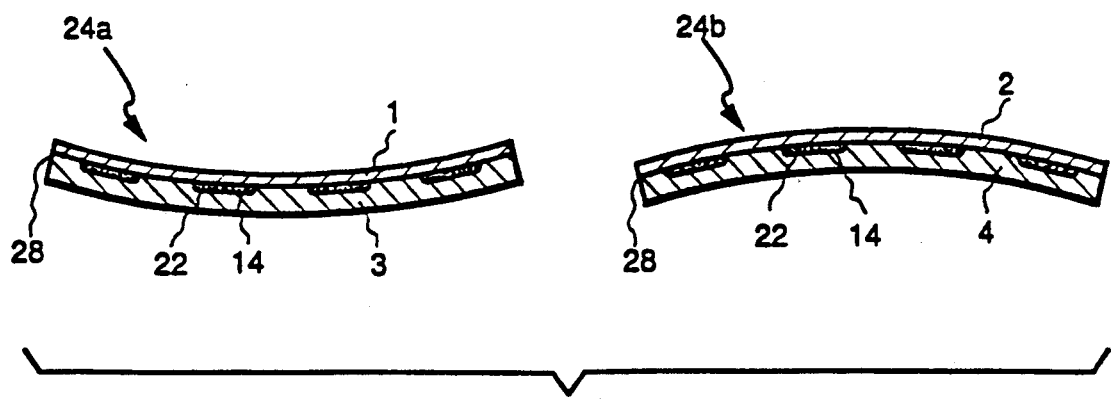
FIG. 6 shows the two sub-assemblies used in the method of the present invention.

Next, the sheets are arranged into pairs to form two in-process sub-assemblies 24a and 24b as shown in FIG. 6. Each sub-assembly comprises one of the core sheets and one of the face sheets. The two sheets of each sub-assembly are juxtaposed, with the inner, machined surface of the face sheet in contact with the corresponding surface of the core sheet. The sheets, having been previously shaped to their in-process shapes, fit snugly together in close conformance. As seen in FIG. 6, sub-assembly 24a comprises the convex face sheet 3 and the corresponding core sheet 1, and sub-assembly 24b comprises the concave face sheet 4 and the core sheet 2. Therefore, sub-assembly 24a will constitute the convex half of the completed airfoil while sub-assembly 24b will constitute the concave half. An inflation gas manifold (not shown) having an externally-protruding inflation port 26 (FIG. 9a) is disposed between the two sheets of each sub-assembly in order to provide a gas inlet to the cavities 14. After all of these elements have been so arranged, a seal weld 28 is applied around the periphery of each in-process sub-assembly to seal the elements together. The sealed sub-assemblies are then evacuated.

Figure 7:
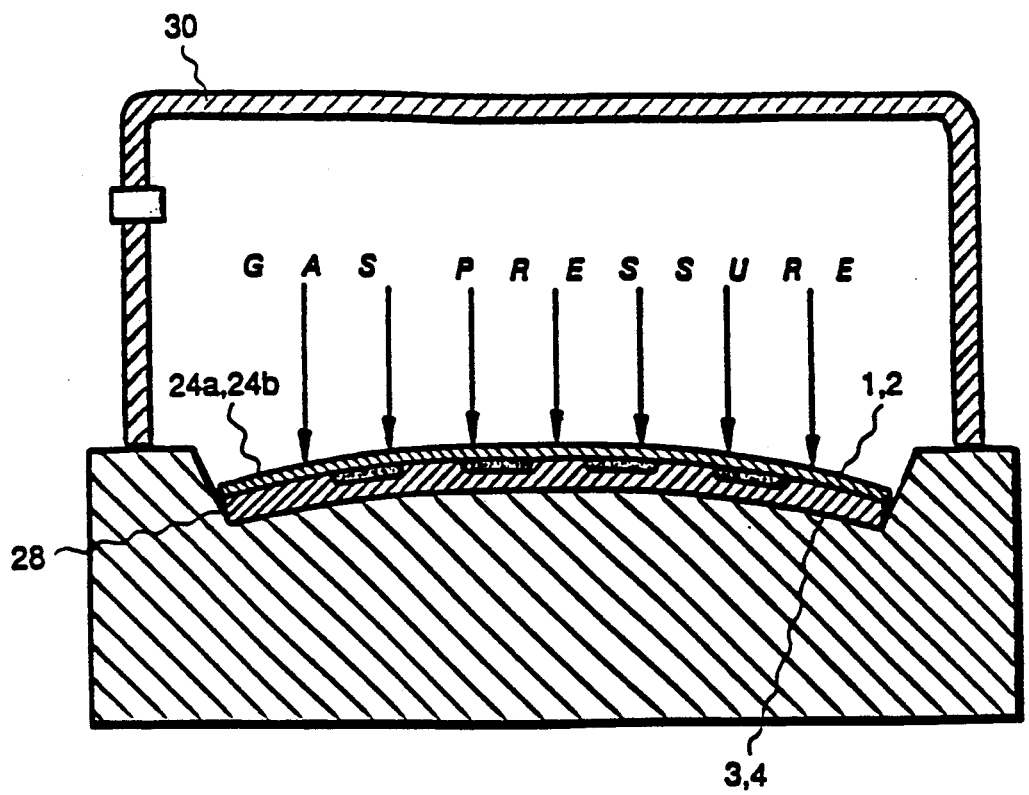
FIG. 7 illustrates the step of diffusion bonding the two sub-assemblies.

The next step is to diffusion bond each of the sub-assemblies 24a,24b. FIG. 7 shows the in-process sub-assemblies 24a,24b placed in an autoclave box 30. (Again, only one sub-assembly is shown for simplicity). The autoclave box is sealed and heated to a temperature in the range of 1600°-1800° F. At this temperature, a pressure in the range of 60-500 psig is externally applied to the sub-assemblies 24a,24b in the autoclave box for up to three and a half hours. Under these temperature-pressure-time conditions, each of face sheets 3,4 diffusion bond to the respective core sheets 1,2. The titanium sheets diffusion bond at the lands 20 and all other locations where no stopoff is applied.

Figure 8:
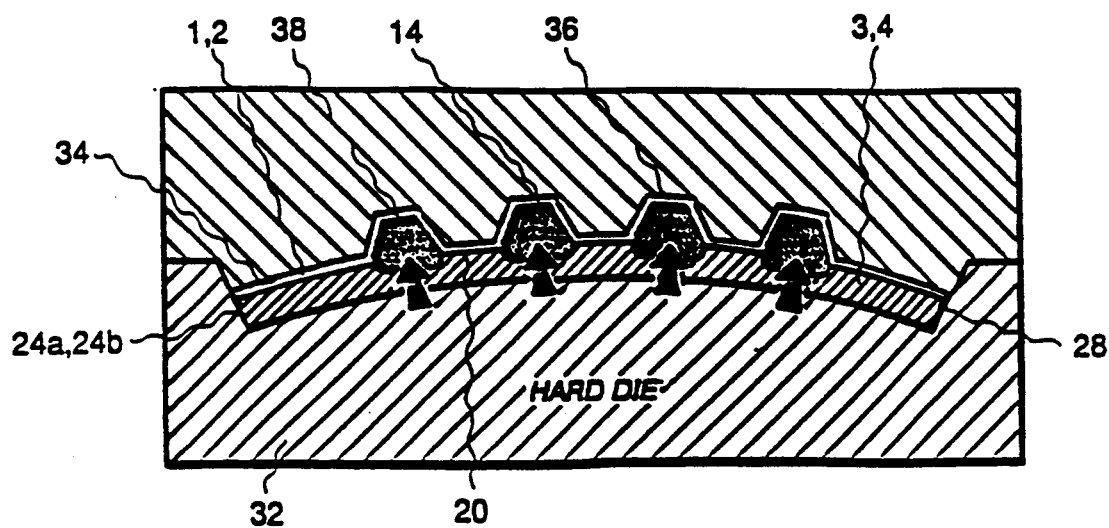
FIG. 8 illustrates the step of superplastic forming the two sub-assemblies.

After diffusion bonding is completed, the in-process sub-assemblies 24a,24b are transferred to a hard die 32 for superplastic forming as shown in FIG. 8. The die 32 has a mold cavity 34 for receiving the respective sub-assemblies. The surface of the mold cavity 34 which is adjacent to the core sheet of a properly positioned sub-assembly is provided with a plurality of elongated indentations 36. The indentations 36 are equal in number to the cavities 14 of the sub-assemblies and are situated on the mold surface so as to be in alignment with the cavities when a sub-assembly is placed in the die. Pressure is applied internally of the now sealed cavities 14 via the inflation port 26 (FIG. 9a) and the inflation manifold. The inflation process is carried out at a temperature in the range of 1500°-1700° F. The pressure is applied at a ramp rate of 5 psig per minute to a maximum pressure in the range of 60-500 psig. This pressure is maintained for up to two and a half hours including the initial pressure build up. Under these time-temperature-pressure conditions, the portions of the core sheets 1,2 overlying the stopoff-filled cavities 14 inflate to fill the indentations 36 and form a series of truncated ridges 38. The portions of the core sheets bonded to the lands 20 and the other portions of the face sheet that lack stopoff are unaffected. The result is a core sheet deformed into a truss-like member which provides internal support to the finished hollow airfoil. Upon completion of this initial superplastic forming stage, the sub-assemblies will have been inflated to approximately 80 percent of the total inflation.

Figure 9A:
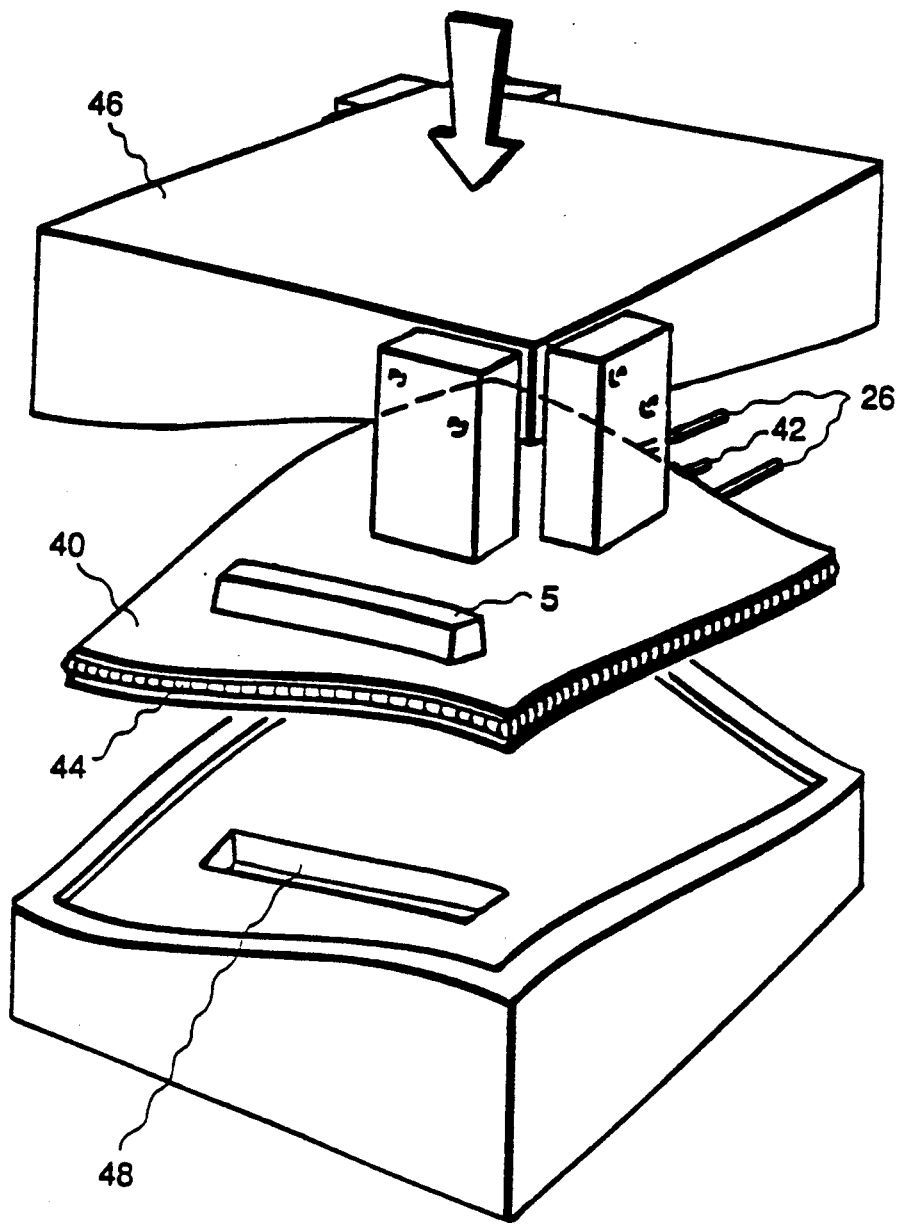
FIG. 9a shows the step bonding the two sub-assemblies into a single assembly.
Figure 9B:
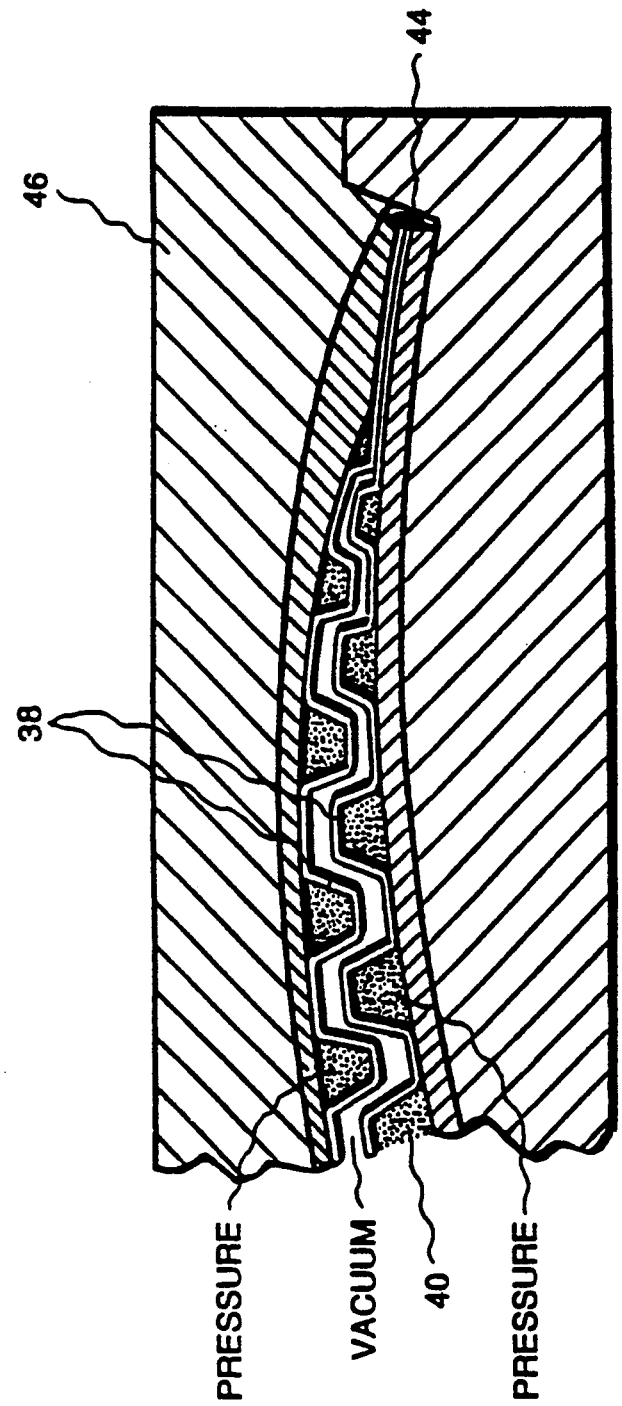
FIG. 9b shows a partial cross section of the assembly in a hard die.

Referring to FIGS. 9a and 9b, the process of combining the two sub-assemblies 24a,24b into a single assembly 40 is described. The two inflated sub-assemblies are placed together so that the respective core sheets are facing one another and the ridges 38 mesh together. A vacuum port 42 is inserted the space between the two sub-assemblies in order to provide a means for creating a vacuum between the core sheets. A seal weld 44 is applied around the periphery of the assembly 40 to seal the elements together. The assembly 40 is placed into a hard die 46 which has a pair of grooves 48 (only one shown) to accommodate the roots 5. A vacuum is created between the two core sheets via the vacuum port 42 and pressure is applied within all of the cavities 14 by means of the inflation manifolds and inflation ports 26 of both sub-assemblies. The internal pressure is built up at a ramp rate of 5 psig per minute to a maximum pressure in the range of 60–500 psig for a total of two to four hours. During this process, the structure is maintained at a temperature in the range of 1500°–1700° F. The resulting pressure differential acting on the core sheets causes each core sheet to become fully inflated. At 100 percent inflation, the two core sheets fully conform to one another. During the time that the pressure differential is applied, the core sheets bond to one another, thereby forming the internal truss structure of the hollow airfoil.

Figure 10:
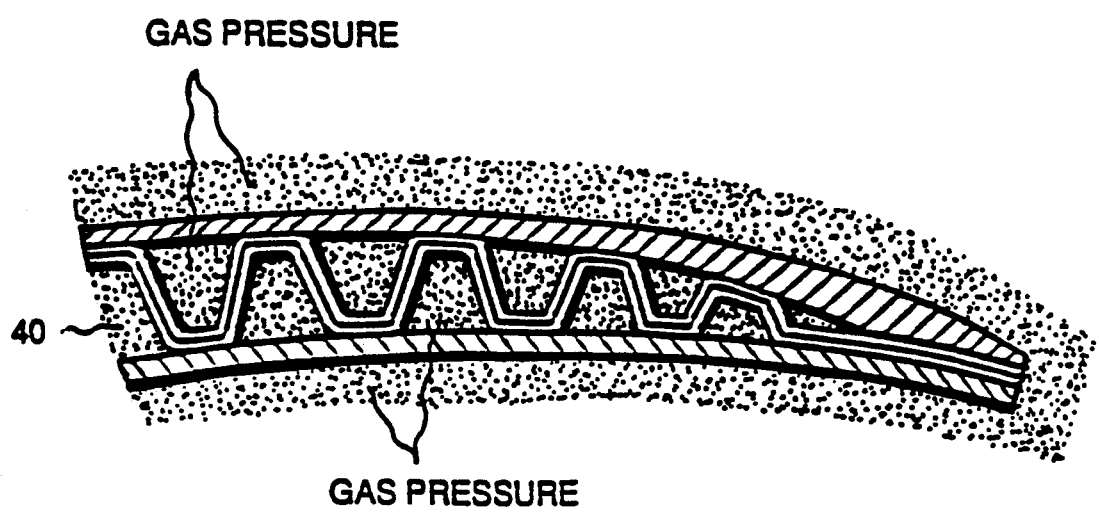
FIG. 10 shows the hot isostatic pressing step of the present invention.
Figure 11:
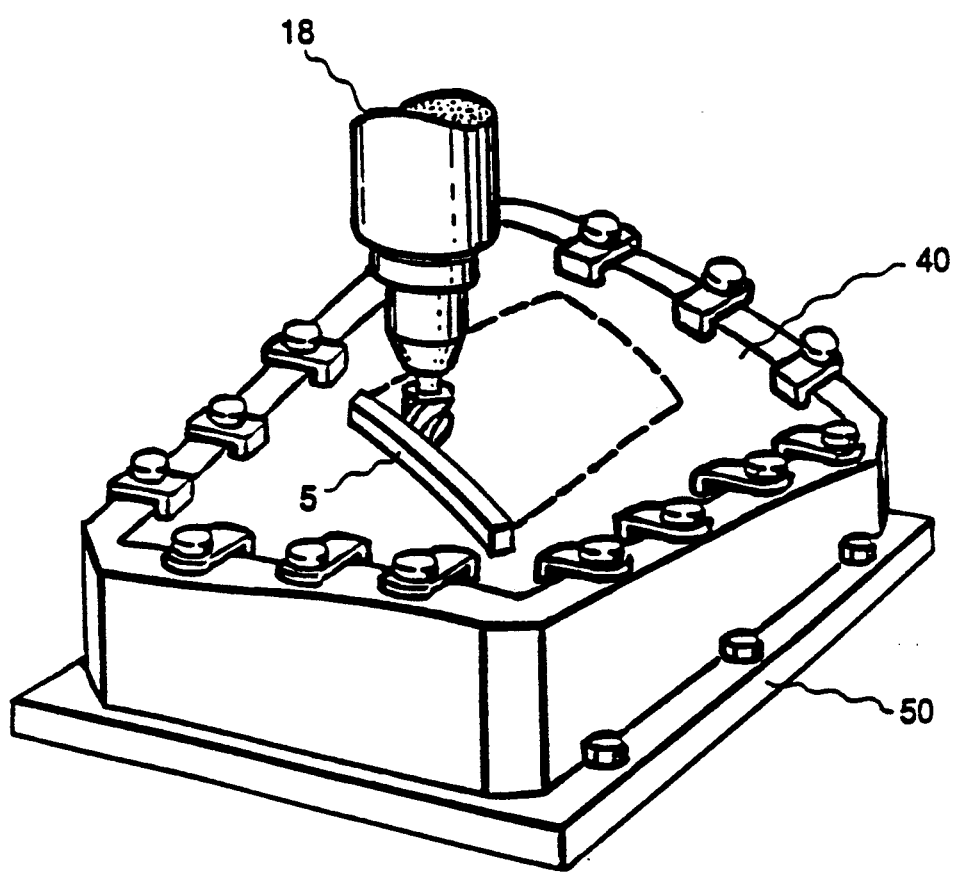
FIG. 11 shows the final machining step of the present invention.

As seen in FIG. 10, the fully inflated and bonded assembly 40 is subjected to hot isostatic pressing at approximately 15,000 psig and 1750° F. for up to two hours. FIG. 11 shows the final-step in which excess material is machined off of the assembly 40 to achieve the final, desired shape (shown in dotted lines in FIG. 11). The assembly 40 is secured in a nest fixture 50 and the mill 18 is used to trim off the extra material.

The foregoing has described a method of manufacturing a four-piece hollow airfoil using diffusion bonding and superplastic forming techniques which overcomes the problems of deformation-induced instabilities and defining the in-process shape.

While specific embodiments of the present invention have been described, it will be apparent to those skilled in the art that various modifications thereto can be made without departing from the spirit and scope of the invention as defined in the appended claims.

I claim:

1. A method of making hollow airfoils from four pieces comprising the steps of:
    forming a plurality of cavities into two of the four pieces;
    joining the pieces together into two pairs so that each pair has a piece with cavities formed therein;
    inflating each of said two pairs into a hollow structure; and
    bonding said hollow structures together in an adjacent relationship to form a hollow airfoil.

2. The method of claim 1 wherein the step of joining the pieces together into two pairs comprises shaping the pieces into in-process shapes, applying stopoff to said cavities, and sealing the pieces of each pair together by welding around their peripheries.

3. The method of claim 2 wherein the step of joining the pieces together further comprises applying a pressure in the range of 60–500 psig at a temperature in the range of 1500°–1700° F. for up to three and a half hours to each pair of pieces after the step of joining the pieces together so that the portions of the pieces that lack stopoff diffusion bond to one another.

4. The method of claim 3 wherein the step of inflating each of said two pairs comprises applying internal pressure to the cavities at a ramp rate of 5 psig per minute to a maximum pressure in the range of 60–500 psig at a temperature in the range of 1500°–1700° F. for a total of up to two and a half hours causing the pieces to inflate and superplastically deform.

5. The method of claim 4 wherein the step of bonding said hollow structures together comprises applying internal pressure to the cavities at a ramp rate of 5 psig per minute to a maximum pressure in the range of 60–500 psig at a temperature in the range of 1500°–1700° F. for a total of two to four hours hours causing the hollow structures to bond to each other.

6. The method of claim 1 further comprising the steps of exposing said hollow airfoil to hot isostatic pressing and machining off excess material after said hot isostatic pressing.

7. The method of claim 6 wherein the step of exposing said hollow airfoil to hot isostatic pressing is carried out at approximately 15,000 psig and 1750° F. for up to two hours.

8. A method of making hollow airfoils having a desired shape comprising the steps of:
    forming two face sheets into respective in-process shapes;
    forming two core sheets into respective in-process shapes;
    machining a plurality of cavities in each of said two face sheets;
    applying stopoff to each of said cavities;
    arranging each of said face sheets with a corresponding one of said core sheets to form two in-process sub-assemblies;
    applying external pressure to each of said two sub-assemblies so that the portions of said face sheets that lack stopoff diffusion bond to said corresponding core sheet;
    applying internal pressure to each of said cavities so that each in-process sub-assembly superplastically deforms into an inflated sub-assembly;
    arranging said inflated sub-assemblies together to form a single assembly with said two core sheets disposed between said two face sheets; and
    applying internal pressure to each of said cavities so that said two sub-assemblies bond together.

9. The method of claim 8 further comprising the steps of exposing said single assembly to hot isostatic pressing and machining off excess material after said hot isostatic pressing.

10. The method of claim 9 wherein the step of exposing said single assembly to hot isostatic pressing is carried out at approximately 15,000 psig and 1750° F. for up to two hours.

11. The method of claim 8 wherein the steps of forming said two face sheets and forming said two core sheets comprise hot forming all of said sheets in a hot form press.

12. The method of claim 11 wherein each of said core sheets is hot formed into a shape substantially identical to the formed inner surface of the corresponding face sheet.

13. The method of claim 8 wherein the step of forming two face sheets comprises near-net-shape forging said face sheets in a forge press.

14. The method of claim 8 wherein the step of arranging each of said face sheets with a corresponding one of said core sheets further comprises sealing the sheets of each respective in-process sub-assembly together by welding around their peripheries.

15. The method of claim 8 wherein the step of applying external pressure to each of said two sub-assemblies comprises placing each of said two sub-assemblies into an autoclave box and applying a pressure in the range of 60–500 psig at a temperature in the range of 1500°–1700° F. for up to three and a half hours.

16. The method of claim 8 wherein the step of applying internal pressure to each of said cavities so that each in-process sub-assembly superplastically deforms into an inflated sub-assembly comprises placing each of said two sub-assemblies in a die and applying pressure to the cavities at a ramp rate of 5 psig per minute to a maximum pressure in the range of 60–500 psig at a temperature in the range of 1500°-1700° F. for a total of up to two and a half hours.

17. The method of claim 8 wherein the step of arranging said inflated sub-assemblies together to form a single assembly further includes sealing said sub-assemblies together by welding around their peripheries.

18. The method of claim 8 wherein the step of applying internal pressure to each of said cavities so that said two sub-assemblies bond together comprises applying pressure to the cavities at a ramp rate of 5 psig per minute to a maximum pressure in the range of 60-500 psig at a temperature in the range of 1500°-1700° F. for a total of two to four hours.

19. The method of claim 8 further comprising using titanium sheets for said two face sheets and said two core sheets.

* * * * *